April 28, 1970  G. RITZERFELD  3,508,487
ARRANGEMENT FOR IMPRINTING AND PUNCHING CARDS
Filed Dec. 13, 1967  16 Sheets-Sheet 14

Inventor:
Gerhard Ritzerfeld
Attorney

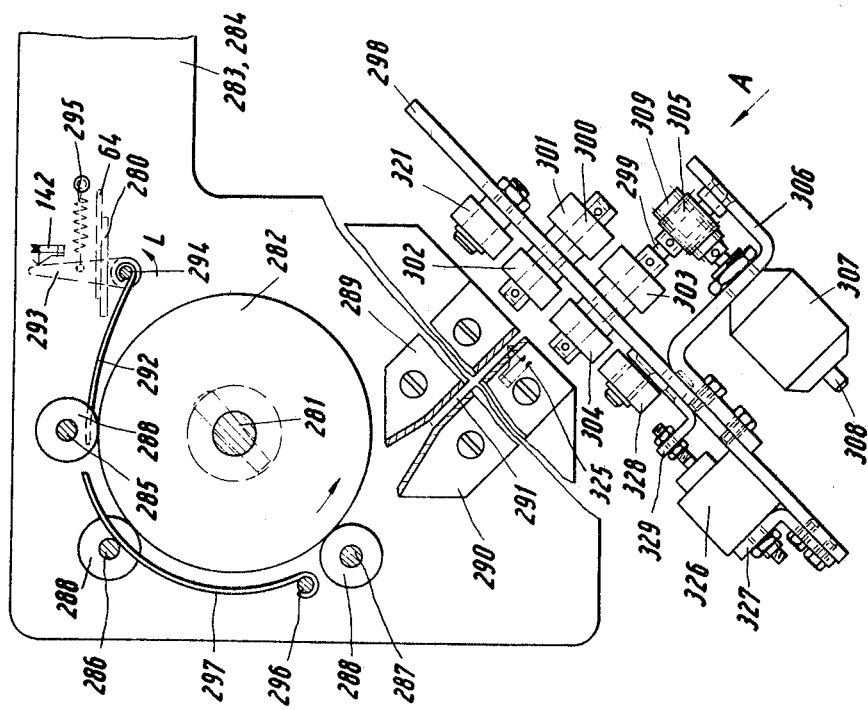

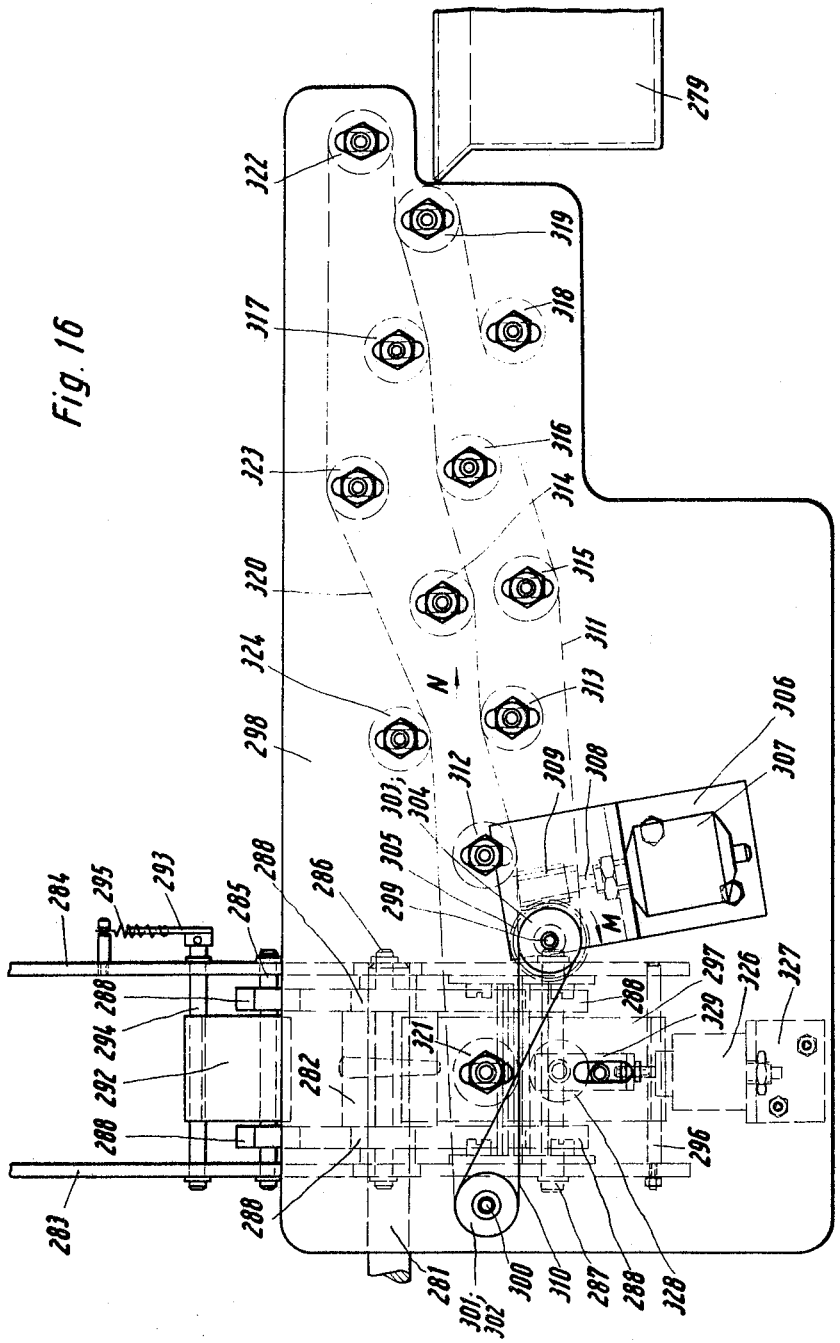

United States Patent Office
3,508,487
Patented Apr. 28, 1970

3,508,487
ARRANGEMENT FOR IMPRINTING AND PUNCHING CARDS
Gerhard Ritzerfeld, Franzensbader Str. 21,
Berlin-Grunewald, Germany
Filed Dec. 13, 1967, Ser. No. 690,151
Claims priority, application Germany, Dec. 16, 1966,
R 44,828
Int. Cl. B44b *5/00;* B45j *3/44*
U.S. Cl. 101—19                15 Claims

ABSTRACT OF THE DISCLOSURE

Cards are imprinted by a printing machine, and punched by a punching device under the control of a record carrier. The printing and punching operations are not synchronized, and imprinted cards are transported to a storage device in which they remain until the punching device is ready to receive cards whereupon cards are transported from the storage means to the punching device.

Background of the invention

The present invention relates to apparatus in which a duplicating machine selectively prints an entire text, or lines of the same by means of a printing form either directly or by means of offset cylinders onto cards or other copy sheets whereupon the same information which is printed is read out from corresponding lines of a record carrier and used for controlling a punching device, or other recording device for punching and recording the information into the imprinted card.

The term "punching" will be used in the present application to define any manner of recording, including the making of marks which are optically read out.

In earlier applications I have disclosed apparatus in which selected lines of a printing form are imprinted on a card, which is then punched by a punching device, operating in synchronism with the printing machine, with holes representing the same information.

The synchronization of the printing and punching operations causes difficulties, particularly if a complicated punching device having between 60 and 80 punches is used for simultaneously punching all required holes in synchronism with the selective printing operations of the printing or duplicating machine. The arrangement is uneconomical since the cost of the punching device is three times the cost of the duplicating machine, and furthermore the duplicating machine cannot be operated at full speed since the maximum speed of a punching device having between 60 and 80 positions is insufficient.

Another disadvantage of the known card imprinting and punching machines is that, if a duplicator using copy sheets moistened with alcohol is used, the imprinted cards arrive at the punching device in moist condition, and before the imprints are permanently fixed.

Summary of the invention

It is one object of the invention to overcome the disadvantages of known card imprinting and punching machines, and to provide an apparatus which can be manufactured at a comparatively low cost, and which operates at high speed to imprint and punch cards with the same information.

Another object of the invention is to operate the printing machine and the punching device entirely independently of each other so that the movements of the printing machine during printing of lines on the cards, are not synchronized with the movement of the punches for punching the cards.

In accordance with the invention, the rhythm of the printing machine operation, and the rhythm of the punching, or other recording operations, is asynchron, and on the path of the cards from the printing machine to the punching device, a storage means is provided for the imprinted cards, and the cards are transported from the storage device to the punching device as required by the rhythm of the operations of the same.

Transporting means between the card storage means and the punching device are controlled and actuated by the punching device to transport single cards, or a stack of cards at the right moment to the punching device.

Preferably, the card storage means are provided with control means for stopping and releasing cards which are actuated by the last card in the punching device. A holding weight on the card stack of the punching device is temporarily raised, and the transporting means are actuated to transport the cards to the punching device.

These operations are preferably controlled by cam means and cam follower means on a shaft which performs single revolutions under the control of a one revolution clutch which is actuated by an electromagnet energized by a switch operated by the last card and by a contact controlled by the card knife.

The cam means are designed in such a manner that first the control means release a card, whereupon the holding weight is raised. When the cards are thus released for transporting movement, rollers of the transporting means are lowered into engagement with the card stack.

Other transporting means are provided for transporting the imprinted cards from the printing machine to the card storage device.

In a preferred embodiment of the invention, guide means are provided for guiding a printed card either to the transporting means for transport to the card storage device, or to the front of the machine so that the respective card is not punched. Preferably, the transporting means are stopped when the guide means do not deliver a card to the transporting means.

In order to prevent that cards are transported while a newly imprinted card is not fully delivered, mechanical or electric switches are located in the path of the cards from the printing machine to the card storage device which, in dependence of the distance of the imprinted card from the card storage device, cause energization of the magnet actuating the one revolution clutch of the control means of the card storage means so that a card is transported to the punching device, or prevent this operation by de-energizing the magnet of the one revolution coupling.

In the preferred embodiment, the imprinted and punched cards are transported back to the printing machine and deposited in front of the printing machine within the reach of the operator. The path of the cards from the printing machine and back to the same is substantially U-shaped, since first transporting means transport the imprinted card to the card storage means along one leg, second transporting means transport the cards from the storage means to the punching device along the yoke, and third transporting means transport the card along the second leg of the U-shaped path to the printing machine.

The punching operations are carried out under the control of a sensing device reading out a record carrier, and a decoding device which translates the coded information of the record carrier into the decimal representation of the punched holes of the punch card. A mechanical, electrical, or optical switch is preferably arranged in the path of the cards from the printing machine to the card storage means for controlling the stepwise operating transporting means of the record carrier so that after the passage of a card the stepwise transport for the duplicator which selectively prints lines or groups of lines, is possible.

In a preferred embodiment of the invention, one or several heating devices which may blow hot air, or radiate heat, are provided for drying a freshly imprinted card before the same is punched. The heating device is only temporarily effective while the card passes through, or stops in the region of the heating device.

Due to the separate and independent working rhythm of the printing machine and punching device, or other recording device, a printing machine, such as a duplicating machine, can work at a substantially higher speed than is possible for a economically manufactured punching device, or other recording device. The present invention makes is possible to use a punching device which punches consecutively groups of holes, and even a punching device which punches ordinal positions, or a line of ordinal positions. The delay of the punched cards as compared with the production of imprinted cards is no disadvantage, since during the time lag, auxiliary operations, such as exchange of a printing form for another, setting of stamping devices, and other operations can be carried out by the operator of the machine. It is also possible, to make a print of the entire text of the printing form, ejecting the imprinted copy sheet to the front of the printing machine, while the last cards of the preceding line printing operations are still being punched and delivered to the printing machine by the transporting means following the punching device.

An apparatus according to the invention preferably comprises a printing machine for imprinting cards with legible information, a punching device for punching the information into the cards, first and second operating means for actuating the printing machine and the punching device to perform printing and punching operations, respectively, independently of each other, card storage means for temporarily storing the imprinted cards, first transporting means for transporting imprinted cards from the printing means to the card storage means, and second transporting means for transporting stored imprinted cards independently of the first transporting means to the punching device, and being controlled by the same in synchronism with the punching operations.

The punching device includes means for actuating the second transporting means to transport a card to the punching device before the same starts a punching operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

Brief description of the drawing

FIG. 15 is a fregmentary schematic side view, partially in section, illustrating transporting means for transporting imprinted and punched cards; and FIG. 16 is an elevation taken in the direction of the arrow A in FIG. 15.

Description of the preferred embodiments

Figure 1:
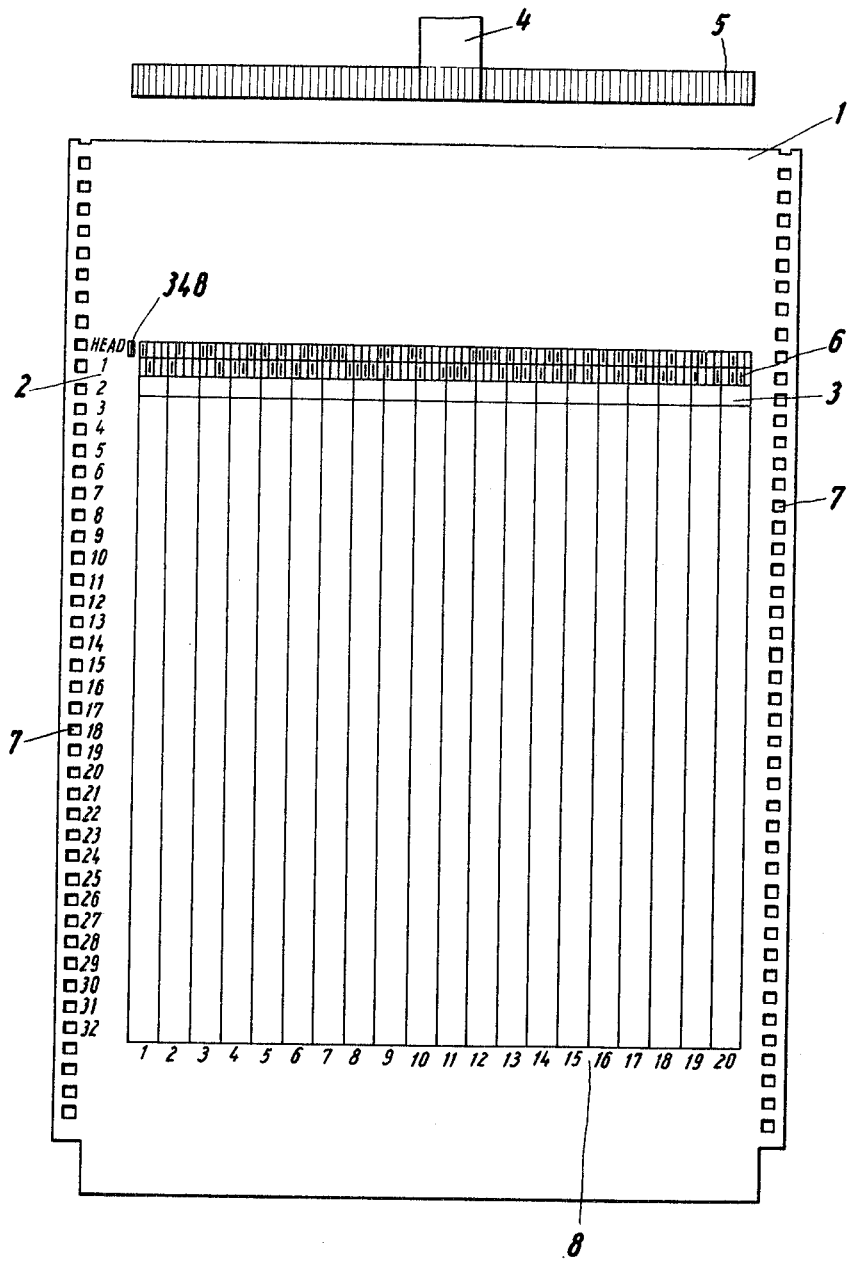
FIG. 1 is a schematic view illustrating a record carrier and a set of brushes.

FIG. 1 illustrates a record carrier 1 in the form of a punch card having the DIN A 4 format. The column 2 identifies a "head" line, and thirty-two lines identified by the numbers 1 to 32. Each line has twenty recording areas 3 designated by a line 8 of numbers 1 to 20. Each recording area 3 is subdivided into four fields which are respectively associated with code elements so that the arrangement of punched holes in the four fields is used for representing the digits from 0 to 9 in each of the twenty positions of the respective line.

Figure 6:
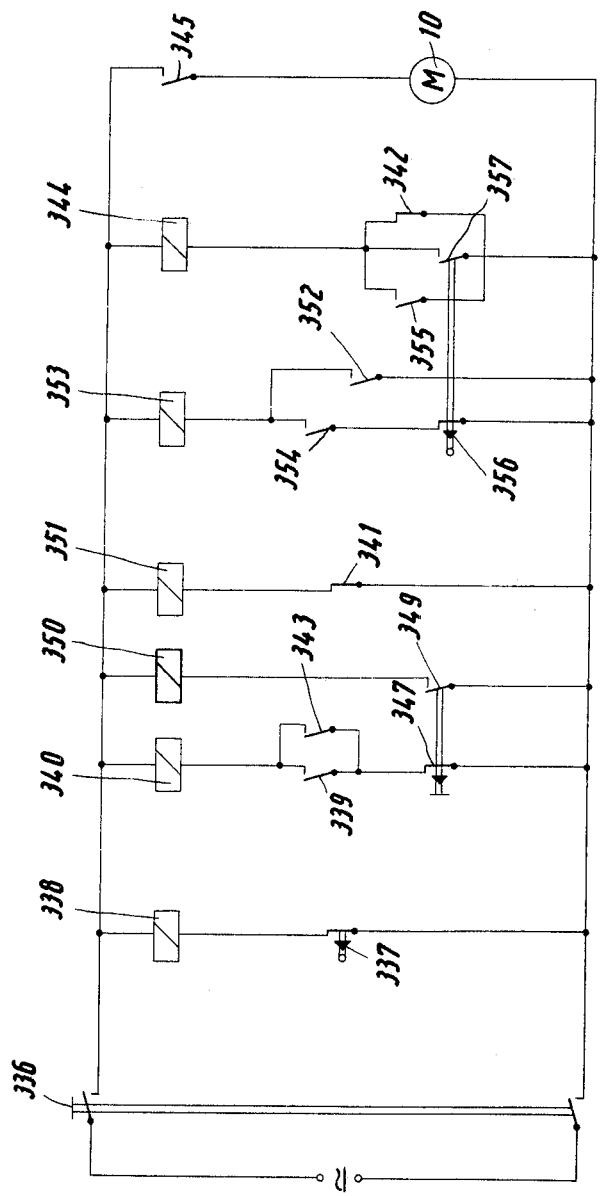
FIG. 6 is a diagram illustrating the circuit by which the read out device is controlled.

For sensing the recorded values, a row of eighty brushes 5 is provided, and an additional brush is used for sensing a control hole 348 in the region of the "head" line whose function will be explained hereinafter with reference to FIG. 6. Two lateral rows of transporting holes 7 are provided for transporting record carrier 1 under the brushes 5 by which the lines are consecutively read out by brushes 5 sensing the coded recordings in the fields of each recording area 3. Instead of punched holes, markings may be made which can be sensed by photocells instead of by brushes 5.

Figure 2:
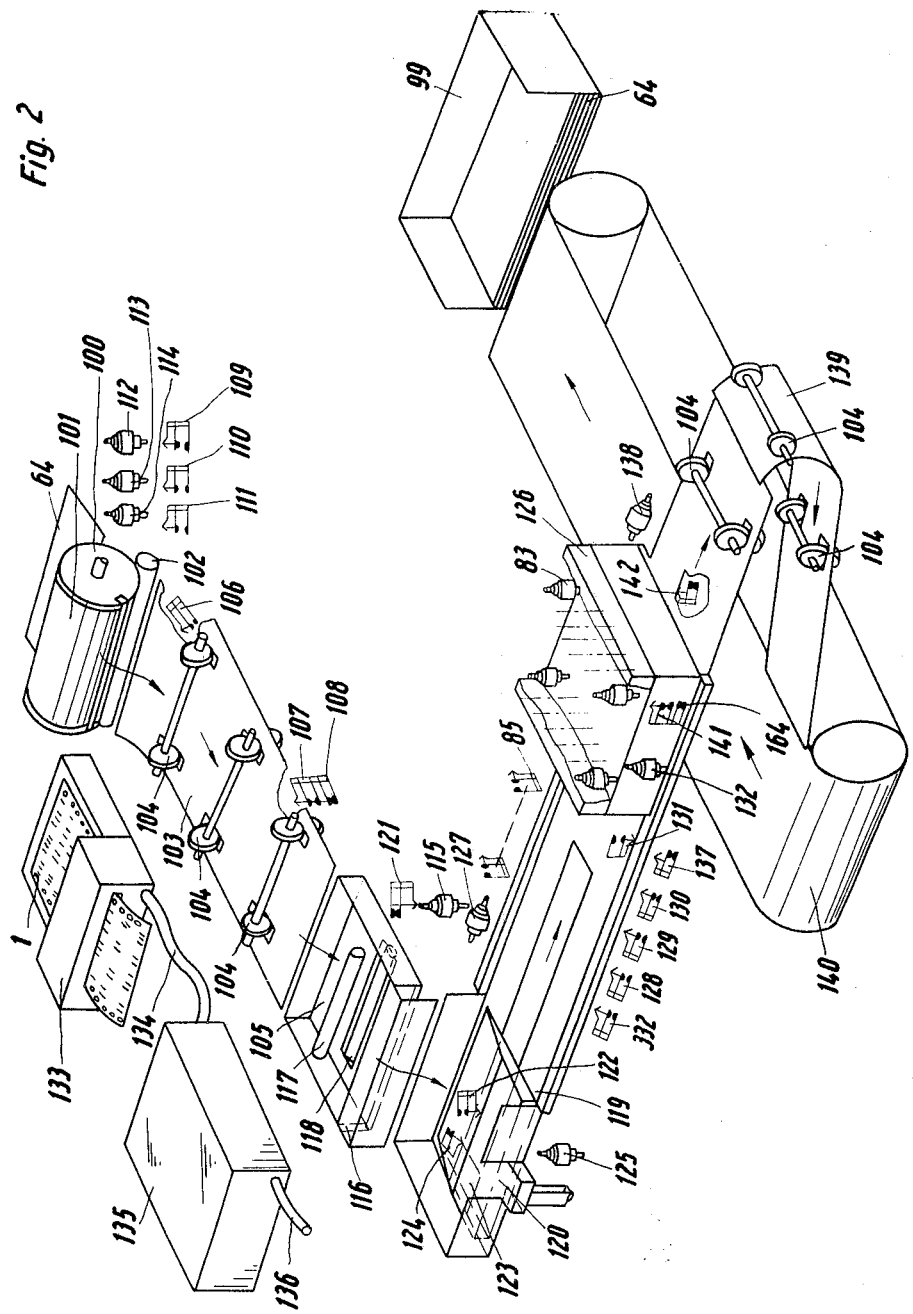
FIG. 2 is a fragmentary schematic perspective view diagrammatically illustrating an arrangement according to the invention.

FIG. 2 illustrates the use of the entire apparatus according to the invention, starting with the printing and punching of a punch card 64 and ending with the deposition of the punched card in a receptacle 99. A punch card 64 is fed to a duplicating roller 100 and a counterpressure roller 102 and is imprinted by the printing form 101 carried by the duplicating roller 100. The entire text of the printing form, or selected lines of the same may be printed. Card 64 is then transported over a transporting sheet 103 by transporting rollers 104 and delivered into a card storage device 105. During the movement of the card, first switch 106 and then switch 107 is closed, and a switch 108 opened simultaneously with the closing of switch 107. Upon closing of switch 106, an electric impulse is transmitted through one of the manually actuated switches 109, 110 or 111 for energizing one of the electromagnets 112, 113, 114 by which the duplicating machine represented by duplicating roller 100 and counterpressure roller 102 is operated to print one, two or three lines of the printing form. The switches illustrated in FIG. 2 will de described in greater detail with reference to FIGS. 3 and 10. When switch 107 closes, an electromagnet 115 is energized which controls the raising of a stop 116 of the card storage device 105 by control means illustrated in FIGS. 13 and 14 which also effect a dropping of transporting roller 117.

The punch card 64 in the card storage device 105 is transferred by transporting rollers 117 and 118 out of the opened card storage device 105 and into the holding means 105a at the inlet part of a card transporting device 119 whose holder 120 is raised by the control elements of stop 116 and of transporting roller 117, and which drops together with flap 116 and the again rising transporting roller 117 so that the punch card 64 is held down by holder 123.

Figure 13:
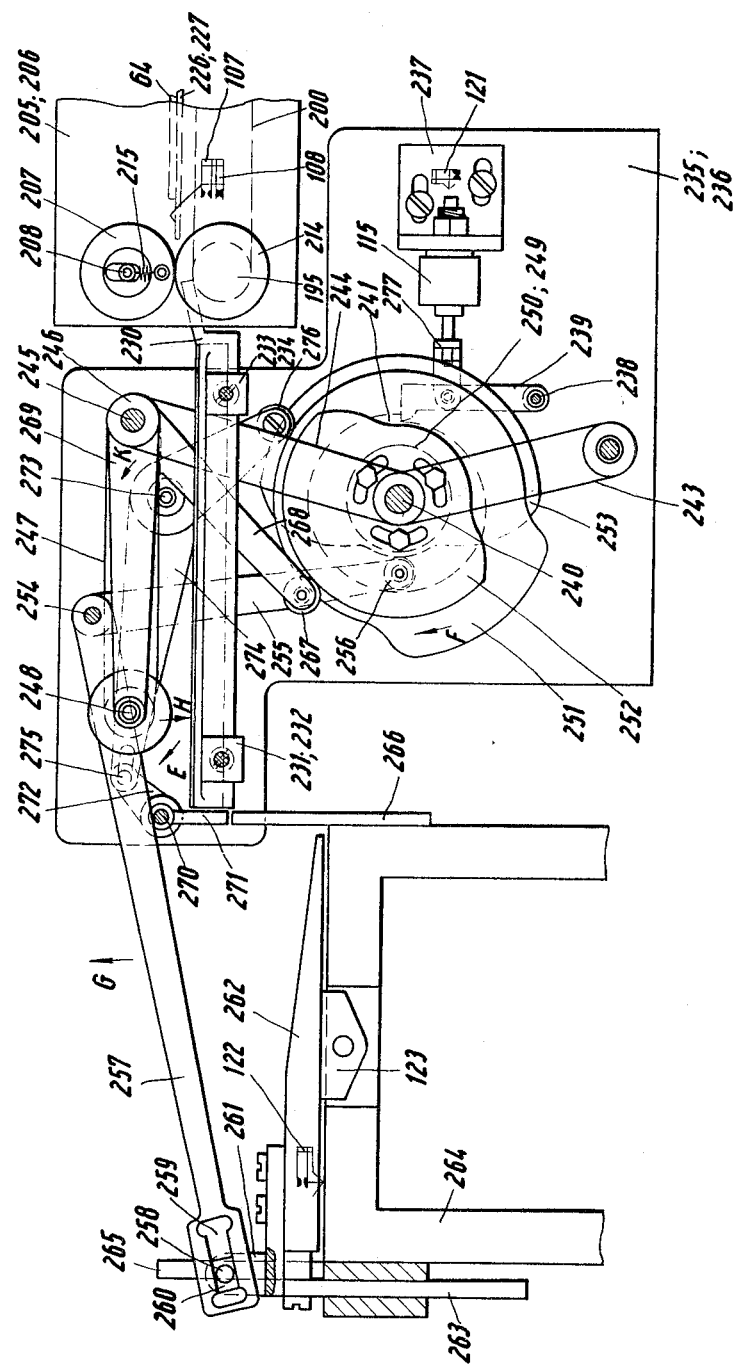
FIG. 13 is a fragmentary schematic side view, partially in section, illustrating apparatus for transporting imprinted cards toward the punching device independently of the printing machine.

Control cams, see FIG. 13, are constructed and arranged so that after closing of switch 107, the raising of stop 116 (271 in FIG. 13) and of holder 120 (264 in FIG. 13) and the lowering of transporting roller 117 are effected only after the card 64 has been transported into card storage device 105. Switch 121 is opened by the energized electromagnet 115. The card 64 in the card transporting device 119 closes a switch 122, and the card knife 123, which is in its normal position, closes the switch 124. Electromagnet 125 which was energized by the closed switch 122, starts the movement of card knife 123 which transports card 64 from the holding means 105a toward the punching station 126 until the card is taken over by a card slide, not shown.

An electromagnet 127, which effects the movement of the card slide with the card 64, is later energized by the closing of switch 141 by a shaft 65, see FIG. 9, and then successively energized by switches 128, 129, 130 and 332, since card 64 is punched in four successive punching strokes, each of which effects the punching of, for example, fourteen holes.

Figure 9:
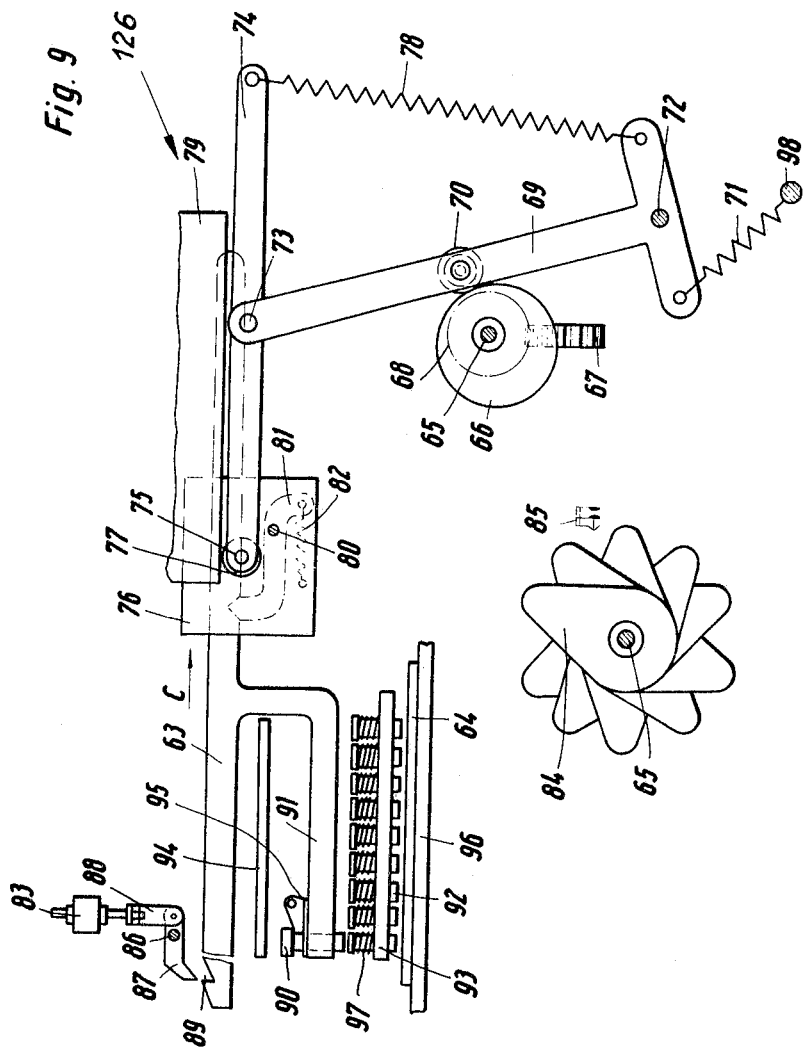
FIG. 9 is a fragmentary schematic side view, partially in section, illustrating the setting means of the punching device.

Before card 64 enters the punching station 126, it closes switch 131 by which electromagnet 132 is energized to start rotation of shaft 65, see FIG. 9.

A record carrier 1 is transported through a read out device 133 and the read out information transmitted through a cable 134 into the decoding device 135 from where the decoded information is transmitted through a cable 136 to an electric storage which will be described with reference to FIGS. 7 and 8 hereinafter.

Ten switches 85 are arranged in a row and are successively closed by the cam means 84 on shaft 65.

Figure 3:
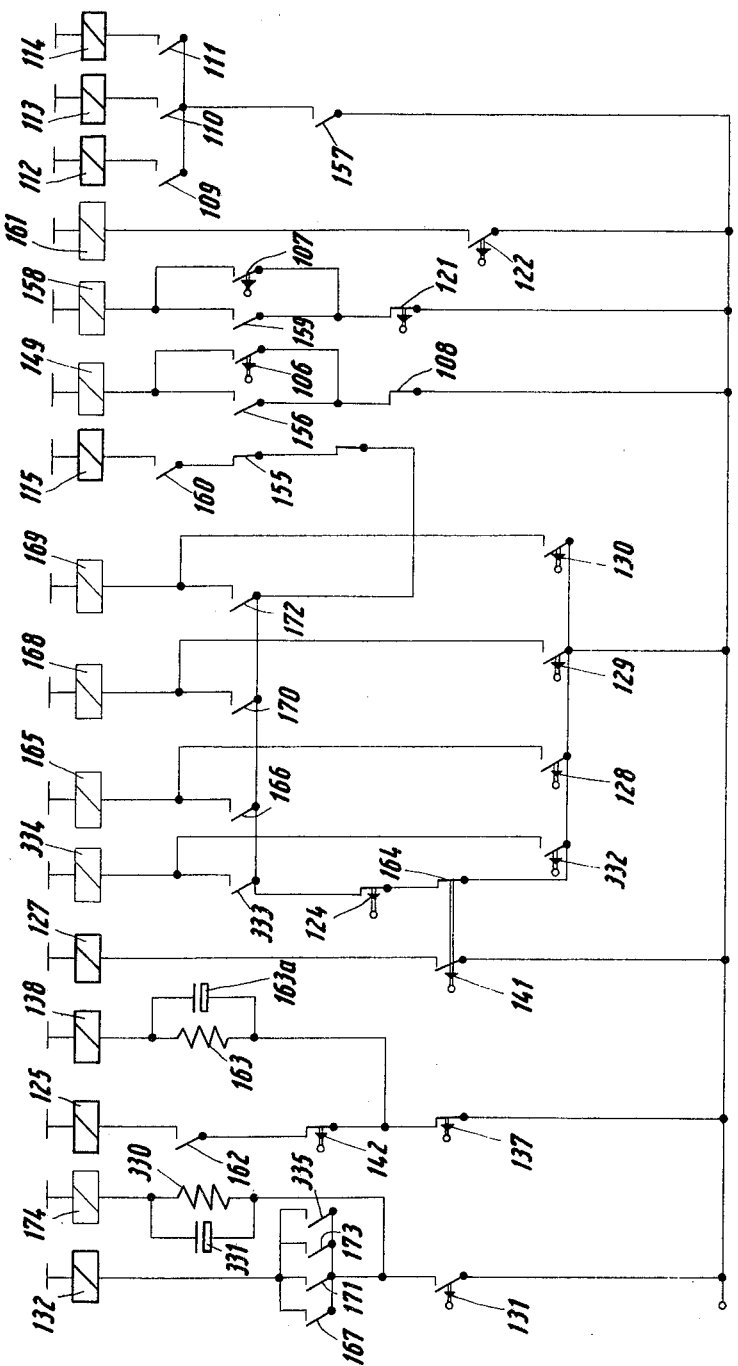
FIG. 3 is a diagram illustrating the electric circuit of the apparatus including switches shown in FIG. 2.

The punching magnets 83, fourteen of which may be provided, are energized in accordance with the respective values and set the punch actuators 63 in an operation which will be described with reference to FIG. 9. Punch card 64 closes control switches 141 and 142 in the punching stations 126 and after discharge from the same. Switch 137, which was open during the punching operation by card 64 resting thereon, is closed after completion of the punching operations. Electromagnet 138 is energized, and operates ejector means, not shown, for card 64. The card is guided over a guide sheet 139, and transported by transporting rollers 104 to a conveyor band 140 by which the card is transported into the receiving box 64. FIG. 3 illustrates the electric circuit of the switches and electromagnets described with reference to FIG. 2. The switches may be mechanical, electronic, or optical switches. When switch 106 is closed by punch card 64, relay 149 is energized and opens contact 155, while closing the holding contacts 156 and 157. When the duplicating machine closes one of the switches 109, 110 or 111, the respective electromagnets 112, 113 or 114 are energized. The transported punch card 64 then simultaneously opens switch 108 and closes switch 107 so that switch 108 interrupts the circuit of relay 149 so that holding contacts 156 and 157 open, and contact 155 closes. The closed switch 107 energizes relay 158 so that the holding contacts 159 and 160 close. Electromagnet 115 is energized and operates the control means which will be described with reference to FIGS. 13 and 14, simultaneously opening switch 121 so that the circuit of the energized relay 158 is interrupted, and the holding contacts 159 and 160 open again. The de-energized electromagnet 115 closes switch 121 again.

When punch card 64 in the card transporting device 119 closes switch 122, relay 161 is energized so that holding contact 162 closes as long as switch 122 is closed by punch card 64. The closed holding contact 162 energizes electromagnet 125 which starts the movement of card knife 123 with the punch card 64 only if switch 137 is not opened by a punch card which is not completely punched. When switch 137 is closed after the completion of the punching operations, the RC network 163 and 163a energizes electromagnet 138 for a short time so that the card ejector, not shown, is operated.

When switches 124 and 164, respectively, are opened, it is not possible to energize electromagnet 115.

When the punch card preceding punch card 64 leaves the punching block 126 shown in FIG. 2, switch 142, which was kept open by the preceding card, is closed, and it is possible to energize electromagnet 125 again.

Switch 164 was also open, and switch 141 closed. The closed switch 141 energizes electromagnet 127 which starts the movement of the card slide, not illustrated. Punch card 64 closes switch 131, and the card slide closes switch 332. The closed switch 332 energizes relay 334 so that electromagnet 132 is energized through holding contacts 333 and 167 to initiate the punching operation.

The transporting slide successively engages switches 128, 129, 130 and closes the same after relay 334 has been de-energized. The energized relays 165, 168, and 169 cause closing of holding contacts 166, 170, 171, 173 and then holding contacts 172 and 335 in succession so that additional three punching operations are initiated. When switch 131 closes, relay 174 is shortly energized by the RC-network 330, 331 so that a line spacing step of record carrier 1 is effected by the device shown in FIGS. 4 and 5.

Figure 4:
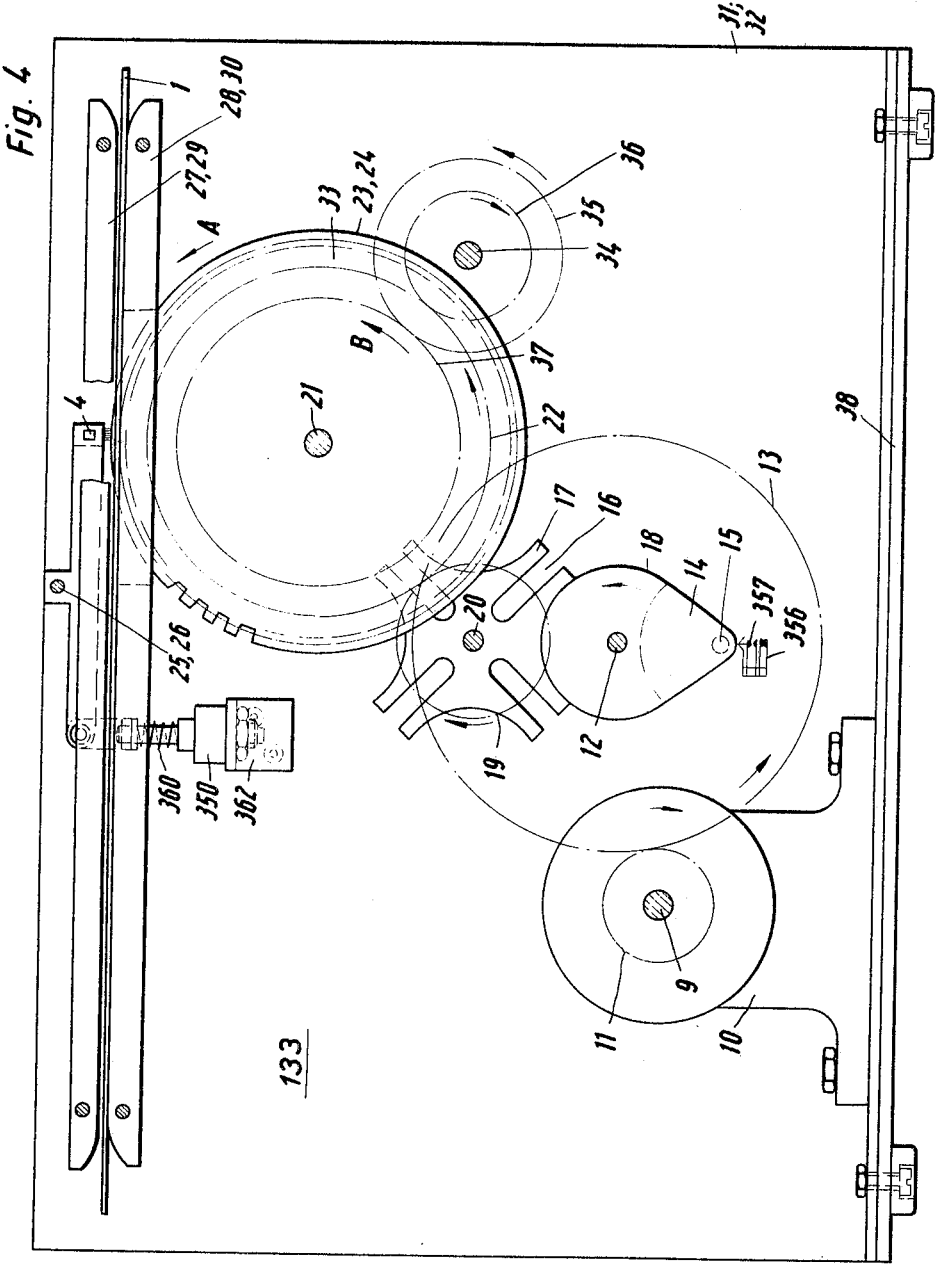
FIG. 4 is a fragmentary schematic side view, partially in section, illustrating a read out device for reading out a record carrier.
Figure 5:
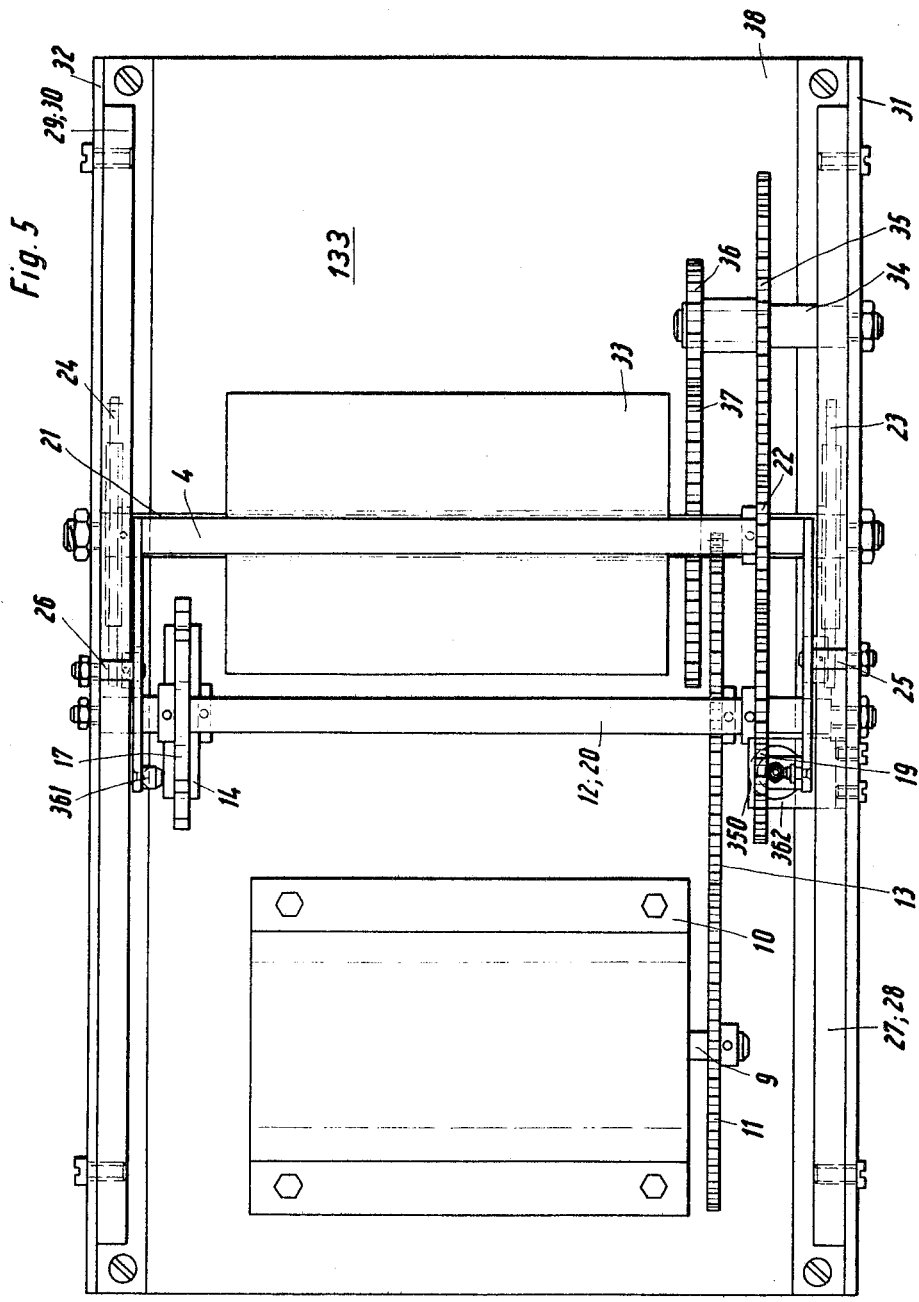
FIG. 5 is a fragmentary plan view of the read out device shown in FIG. 4.

FIGS. 4 and 5 illustrate a read out device 133 described with reference to FIG. 2 which senses the punched holes of record carrier 1 and conveys the information to the decoding device 135, while record carrier 1 is transported line by line. A gear 11 is secured to the shaft 9 of a brake motor 10 and drives a gear 13 secured to a shaft 12 so that the drive member 14 of a Geneva mechanism is turned, and the drive roller 15 enters into a slot 16 of the Geneva wheel 17, turning the same one angular step of 90° in the direction of the arrow until drive roller 15 moves out of the respective slot 16 so that the wheel 17 is stopped and arrested by the circular stop surface 18. Drive member 14 has arrived again in its initial position and remains in the same since the motor 10, which is a brake motor secured to the base plate 38, stops.

Gear 19, which is secured to shaft 20 of Geneva wheel 17 transmits the angular motion to a gear 22 on a shaft 21 so that the transporting gears 23 and 24 transport the record carrier 1 one line step in the direction of the arrow A.

Brushes 4, mounted on pins 25 and 26, sense the recordings on record carrier 1 and introduce the read out information into the decoding device 135 which will be described with reference to FIGS. 6 and 7. Brush 4 is pressed by springs 360 and 361 into engagement with record carrier 1. When an electromagnet 350, mounted on a bracket 362 is energized, as will be described with reference to FIG. 6 in detail, brush 4 is raised, turning about journal pins 25 and 26 to a position spaced from the record carrier 1 which is guided in guide rails 27, 28, 29 and 30 secured to lateral walls 31 and 32. In order to prevent oxidizing of the contact roller 33 which is turnable on shaft 21, gear 37, which is secured to contact roller 33, is driven in the direction of the arrow B during the turning movement of gear 22 through a pair of gears 35 and 36 which are mounted on the journal 34.

The arrangement and dimensions of the gears are selected so that the turning movement of contact roller 33 during a line step of record carrier 1 is greater than the turning movement of transporting rollers 23 and 24. If transporting rollers 23 and 24 are to make a step opposite to the direction of the arrow A together with record carrier 1, brake motor 10 can be actuated by a manually operated switch, not shown, to rotate in a reversed direction of rotation. The function of switches 356 and 357 will be described with reference to FIG. 6 which shows the electric circuit for the control of the read out device 133.

When the main switch 336 is closed, relay 338 is energized which closes holding contact 339. Relay 340 is energized and opens contacts 341 and 342, simultaneously closing the holding contacts 343 and 150, see FIG. 10. Relay 344 cannot be energized, and since contact 345 is opened, motor 10 cannot be started. When key 346 is shortly actuated, switch 347 opens, relay 340 is de-energized, and contact 342 closes. Relay 344 is energized and holding contact 345 is closed.

Motor 10 now effects the advance of the record carrier 1, as described with reference to FIGS. 4 and 5, and switch 337 is opened until the record carrier 1 arrives in a position in which the "head" line is sensed by the brush means 4 shown in FIG. 4. When contact 342 closes, holding contact 150 opens so that the information relating to the "head" line of the last sensed record carrier is cleared, assuming that the main switch 336 was not opened when the last record carrier was removed, and a new record carrier was inserted. When switch 347 opens, switch 349 is closed, electromagnet 350 is energized, and the pivotal movement of brush means 4, described with reference to FIGS. 4 and 5, is effected.

Figure 10:
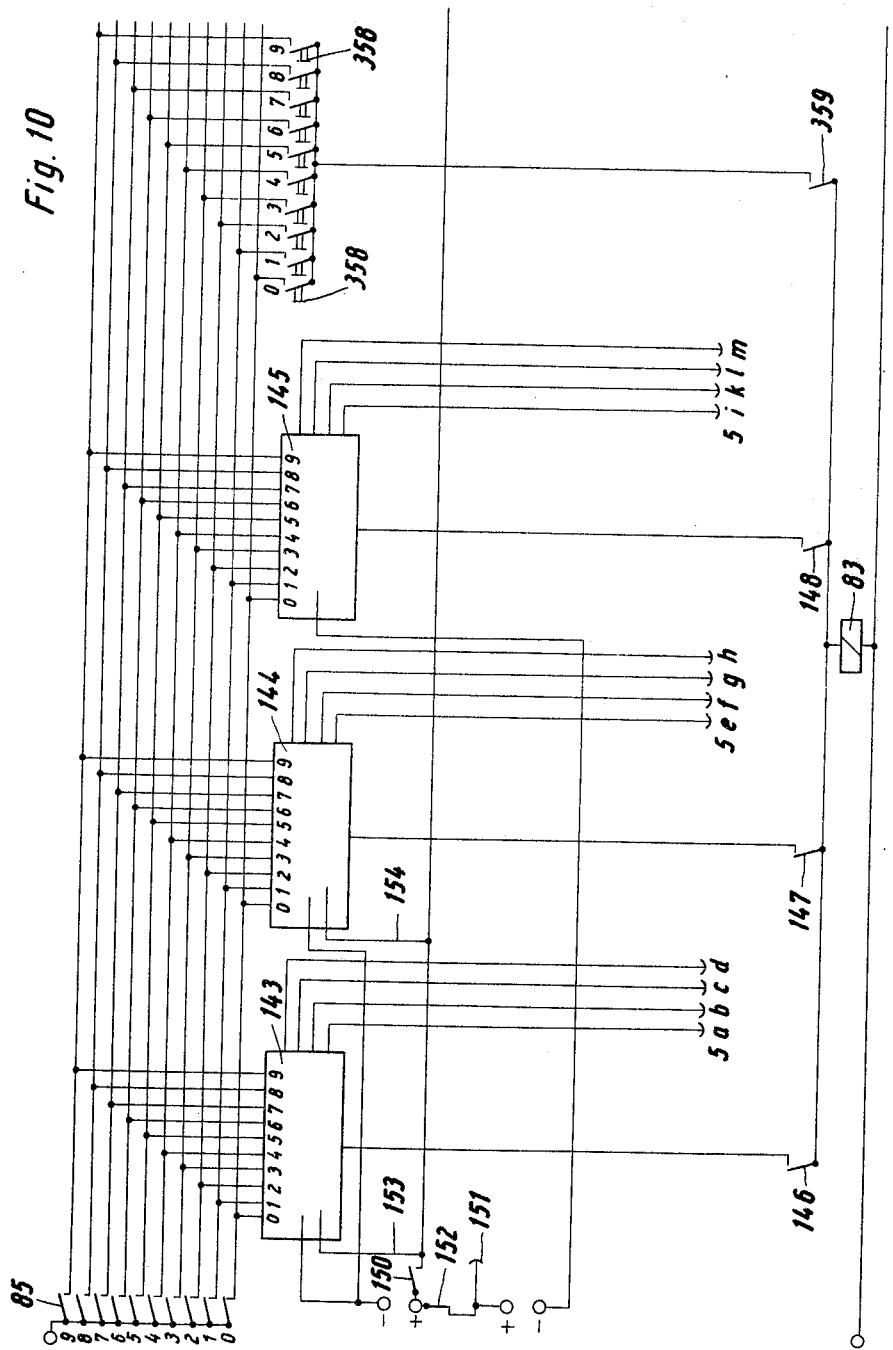
FIG. 10 is a diagram illustrating the electric circuit for further decoding the information read out from the record carrier, and for controlling the operations of the setting device shown in FIG. 9.

When the "head" line arrives in a position to be sensed by brush means 4, switch 337 is closed under the control of an impulse produced by the control hole 348 in record carrier 1 described with reference to FIG. 1. Relay 344 is de-energized, holding contact 345 opens, and motor 10 stops, so that the information contained in the "head" line remains under the brush means 4 since the record carrier is stopped. When relay 340 is de-energized, contact 341 closes, and relay 351 is energized so that holding contact 152 shown in FIG. 10 is closed, and performs the function which will be described with reference to FIG. 10.

As described with reference to FIG. 2, switch 131 is closed by the printed punch card 64 so that the RC circuit 330, 331, a resistor capacitor network, shortly energizes relay 174 shown in FIG. 3. The holding contact 352 of relay 174 closes and relay 353 is energized, so that the two holding contacts 354 and 355 are also closed. Holding contact 352 opens since relay 174 is de-energized, but relay 353 remains energized since holding contact 354 is closed. Relay 344 is energized and closes holding contact 345.

Motor 10 now transports record carrier 1 another step until the first text line following the "head" line, see FIG. 1, is located under the brush means 4.

When the drive member 14 of the Geneva mechanism shown in FIG. 4 moves out of its initial position, switch 356 is opened and switch 357 closed. Relay 353 is de-energized, and holding contacts 354 and 355 open again.

Switch 357 energizes relay 344 until the Geneva wheel 17 stops again after effecting a step of record carrier 1 to the next following line in which position drive member 14 closes switch 356 and opens switch 357 so that relay 344 is de-energized, holding contact 345 opens, and motor 10 is de-energized and stops.

If it is desired to remove record carrier 1 from the read out device 133, see FIG. 2, pushbutton 346 is shortly actuated and switch 347 opens so that relay 340 is de-energized, closing contact 342. Motor 10 is energized and transports record carrier 1 through the Geneva mechanism 14, 17 until the record carrier leaves the region of switch 337, and relay 340 is energized since switch 337 is closed, and energizes relay 338 which actuates the holding contact 339 of relay 340 which opens holding contact 242 whereby the motor is again de-energized.

Figure 7:
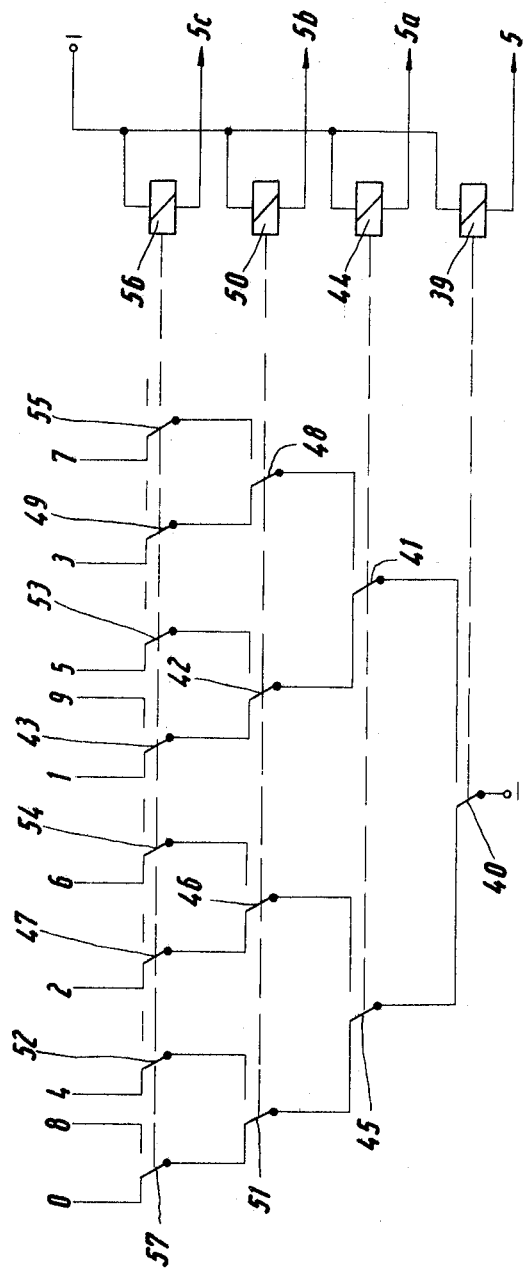
FIG. 7 is a diagram illustrating the electric circuit for reading out and partly decoding coded information recorded in a text line of a record carrier by which the punching device is controlled.

FIG. 7 illustrates a circuit for reading out information represented in coded form by holes in four fields of an area 3 of the twenty areas 3 provided in a text line of record carrier 1. Four brushes 5, 5a, 5b, 5c are respectively associated with the four fields of each of the twenty recording areas 3 of each line. The four brushes sense in which of the four fields, holes 6 are provided to represent in a code having four code elements, the information stored in the respective area 3. If in an area 3, the first of the four fields is perforated, which may represent the digit 1, brush 5 senses this hole 6. The circuit of relay 39 is closed due to the contact between brush 5 and contact roller 33, see FIGS. 4 and 5, so that switch 40 is operated. The circuit of a punching magnet of the punching device is closed through switches 40, 41, 42, 43 which causes actuation of a punch which is in a position to punch in a standard punch card, a hole representing the digit 1, as will be explained hereinafter in greater detail with reference to FIG. 9. If relay 44 is energized by brush 5a sensing a hole in the second field, which may represent the digit 2, a punching magnet is energized over switches 40, 45, 46, 47 to operate a punch in a position for punching a hole representing the digit 2 in a standard punch card.

If both relays 39 and 44 are energized by the brushes 5, 5a sensing two holes in the first two fields, which is assumed to represent the digit 3 in the selected code, a punch magnet for operating a punch in a position for punching a hole representing the digit 3, is energized over switches 40, 41, 48 and 49.

If relay 50 of brush 5b is energized upon sensing of a hole in the third field of the respective area 3, a punch magnet is energized over switches 40, 45, 51 and 52 to punch a hole representing the digit 4. If relays 39 and 50 are energized, a punch magnet for representing the digit 5 is energized over switches 40, 41, 42 and 53. If relays 44 and 50 are energized, a punch magnet representing the digit 6 is energized over switches 40, 45, 46, 54. If relays 39, 44 and 50 are energized by the brushes sensing corresponding holes, a punching magnet for punching a hole representing the digit 7 is energized over switches 40, 41, 48 and 55. If relay 56 is energized by brush 5c sensing a hole in the fourth field, the closed switches 40, 45, 51 and 57 operate a punching magnet representing the digit 8. If relays 39 and 56 are energized, a punching magnet representing the digit 9 is energized over switches 40, 41, 42 and 43.

If none of the four fields of an area 3 in a sensed line has a hole, the closed switches 40, 45, 51 and 57 energize a punching magnet associated with the digit 0 so that a hole is punched in the punch card in a position representing the value zero. Each of the twenty areas of a read out line is sensed by a group of four brushes so that eighty brushes are required for reading out all fields of a line, brush means 4 having an additional eighty-first brush for reading out a recording 348 in a control field provided in the "head" line, as described with reference to FIG. 1.

When the record carrier 1 is transported to a position in which the next line of twenty areas 3 is located under brush means 4, the brushes 5, 5a, 5b, 5c which sense an area 3 of the preceding line, as explained above, will now sense an area 3 of the next following line located in the same column as the previously sensed area 3. When record carrier 1 is moved one step to place the following line under brush means 4, relays 39, 44, 50 and 56 are de-energized, and are again energized depending on the information recorded by holes 6 in the four fields of the sensed area 3 of the new line of areas 3.

Figure 8:
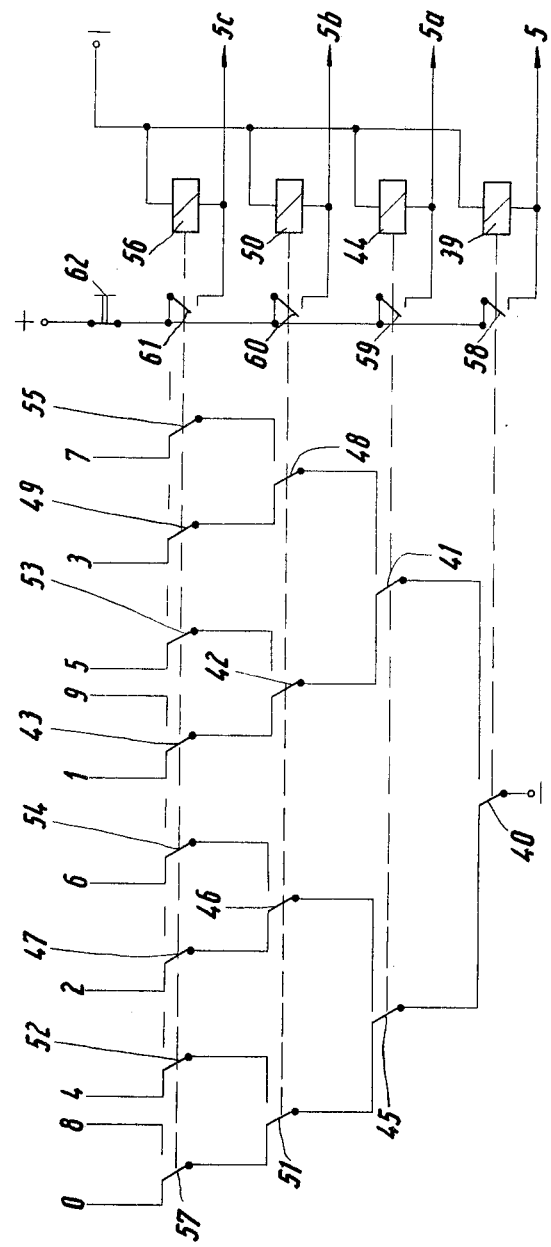
FIG. 8 is a diagram illustrating the electric circuit for reading out and partly decoding coded information contained in a line of the record carrier representing a head line which is repeatedly printed on successive cards.

FIG. 8 illustrates the circuit for reading out, storing and decoding the information represented in the form of holes in a coded arrangement in four fields of an area 3 of the "head" line. The decoding and reading out takes place as described with reference to the decoding and reading out of an area 3 of one of the thirty-two text lines.

When brushes 5, 5a, 5b, 5c sense coded information, the respective relays 39, 44, 50 and 56 are energized, and the respective switches 58, 59, 60 and 61 close and hold the respective relays. When record carrier 1, see FIG. 1, carries out one or several line steps, the introduced values are not cleared, since the respective relays are held energized by holding contacts. The "head" information can consequently be punched in successive punched cards together with different text information. Only when switch 62 is manually operated, the "head" information is cleared. In a modified arrangement, switch 62 is automatically operated at a predetermined moment by a mechanical part of the read out device for clearing the "head" information.

It will be seen that the circuit of FIG. 8 corresponds to the circuit of FIG. 7 with switches 58 to 61 and clearing switch 62 added. Consequently, the manner in which the coded holes in four fields of an area 3 of the "head" lines are read out is the same as described with reference to FIG. 7, and need not be further described.

FIG. 9 illustrates the punching device. Assuming that fourteen holes are to be simultaneously punched, fourteen punch actuators 63 are arranged in a row. The punch card 64 is transported in a direction perpendicularly to the direction of movement of the punch actuator 63 represented by the arrow C. Each punch actuator carries a hammer 90 held in a normal position by a spring 95 and cooperating with one of nine punches 92 held in inoperative positions by springs 97. Fourteen rows of nine punches are provided to cooperate with the fourteen punch actuators 63, 90 which are movable in the direction of the arrow C between nine positions in which hammer 90 is located above different punches 92 of the respective row.

Shaft 65 is driven by worm gear drives 67 and 68 and rotates an eccentric circular cam 66 in contact with a follower roller 70 on follower lever 69 so that the latter is angularly displaced about its pivot shaft 72 and holds a link 74 to which follower lever 69 is connected by a pin 73, in the direction of the arrow C against the action of a spring 78 connecting link 74 with an arm of follower lever 69. The end of link 74 carries on a pin 75, a guide roller 77 which rolls along a horizontal guide rail 79 under the action of spring 78. Pin 75 pivotally supports a guide block 76 which is also guided between two guide rails 79 and carries on a pivot pin 80, a catch 81 biased by a spring 82 to snap into a corresponding recess in an elongated arm of the respective punch actuator 63. Consequently, reciprocation of follower lever 69 causes reciprocation of the respective punch actuator 63 along an exactly straight path. A punching electromagnet 83, which is associated with a group of four brushes 5, 5a, 5b, 5c, is controlled by ten angularly staggered cams 84 secured to shaft 65, and being shown in FIG. 9 displaced relative to eccentric cam 66 for the sake of clarity. Control cams 84 operate ten switches 85 which are arranged in a row along shaft 65 spaced the same distance as cams 84. The electric circuit will be described with reference to FIG. 10. When a punching magnet 83 is energized, its armature is raised and turns through a link 88 a blocking lever 87 to a blocking position engaging a recess 89 in the respective punch actuator 63 so that the respective punch actuator 63 is blocked and cannot be pulled in the direction of the arrow C by the drive means 65, 66, 69, 74, 75, 76, 80 and 81. The hammer 90 stops directly above one of the nine punches 92 which are guided for vertical movement in a horizontal guide plate 93 and are biased into an upper position spaced from the punch card 64 by springs 97.

When all actuator bars have been arrested in the respective digital positions by the blocking means under control of the punching magnets 83, the punch plate 94 is operated to push the hammers 90 of the punch actuators 63 downward to actuate the respective punch 92 so that the same punches a hole in punch card 64. When punch plate 94 is raised again, spring 95 raise hammers 90, and the springs 97 raise punches 92 to the normal inoperative positions. The number of blocking recesses 89 corresponds to the number of punches 92 so that each punch actuator 63 can be stopped in one of nine positions in which its hammer 90 is located above a selected punch representing one of the digits from 1 to 9. Consequently, the coded information of record carrier 1 and read out by a group of brushes 5, 5a, 5b, 5c, is decoded and represented on the record card 64 by holes in accordance with the decimal system.

When a punch actuator 63 is blocked by its blocking lever 67 in any of the digital positions, coupling pawl 81 releases the respective recess in punch actuator 63 since guide body 76 is pulled in the direction of the arrow by link 74 and follower lever 69.

After the punching operation has been completed, follower roller 70 engages again the lowest portion of eccentric cam 66 so that spring 71 secured to a fixed support 98 turns follower lever 69 about pivot pin 72 in counterclockwise direction whereby link 74 moves guide body 76 with coupling pawl 81 against the direction of the arrow C until coupling pawl 81 snaps into the recess of the respective punch actuator 63 so that the same is transported to the left as viewed in FIG. 9 until the first blocking recess 89 is located under blocking pawl 87, as shown in FIG. 9. In this position, hammer 90 is located above the first punch 92.

FIG. 10 illustrates the circuit by which the information read out by groups of four brushes in coded form, is decoded by causing energization of punching magnet 83.

A first group of brushes 5a, 5b, 5c, corresponding to the group of brushes 5, 5a, 5b, 5c described with reference to FIG. 7, senses the coded information represented by the holes in the four fields of the first area 3 of the "head" line shown in FIG. 1, and produces corresponding electric impulses which are supplied to the decoding device 143 which is illustrated as a block in FIG. 10 and includes the "head" decoding circuit illustrated in FIG. 8. Assuming that punch card 64 is to be punched in fourteen positions during each of four punch strokes, brushes 5e, 5f, 5g, 5h read out the coded information of the fifteenth area 3 of the "head" line, and brushes 5i, 5k, 5l and 5m read out the coded information contained in the ninth area 3 of the first text line so that the group of brushes 5e, 5f, 5g, 5h produces impulses which are supplied to the "head" decoding device 144, and the group of brushes 5i, 5k, 5l, 5m, produces impulses which are supplied to the text line decoder 145 whose circuit is shown in FIG. 7.

As explained with reference to FIG. 9, ten switches 85 are sequentially closed by control cams 84. Depending on the values read out by a group of brushes and transmitted in the form of impulses to the "head" decoder shown in FIG. 8, or to the line decoder shown in FIG. 7, closing of switch 85 representing the respective introduced value, causes closing of switches 146, 147 or 148, or switch 359, respectively, corresponding to the first, second and third punching stroke so that one of the punching magnets 83, described with reference to FIGS. 2 and 9, and also shown in FIG. 10, is energized to set the respective punch actuator 63 to the respective digit value as explained with reference to FIG. 9. When used with the recording carrier 1 as shown in FIG. 1, each punch card can be punched in twenty positions for representing the "head" information, and in twenty positions representing text line information. Additionally, each punch card 64 can be punched to represent sixteen variable informations.

In the illustrated example, the switches 358 by which the desired value can be programmed, are associated with the third position of the variable informations, namely in the first position of the fourth punching stroke. The programmed values of the "variable" informations remain until a new value is introduced by closing of another switch 358. The transport of record carrier 1, and the opening of holding switch 150 and the clearing of the "head" information of the preceding record carrier 1 caused thereby, takes place as described with reference to FIG. 6.

When the "head" line of record carrier 1 is read out by the row of brushes 5, switch 150 is again closed, and the read out information is introduced by the energized brushes 5 through slide contact 151 engaging contact roller 33 (FIG. 4) into the "head" decoder 143, 144 etc. and into the line decoding device 145.

When the first line of the record carrier 1 is sensed by brush means 4, 5, switch 152 opens. The "head" values stored in the line decoding device 145 are thus cleared, and the read out information of the first text line is introduced into the line decoding device 145 etc. The holding voltages in lines 153 and 154 effect storing of the "head" line values in the decoding devices 143, 144 until a new record carrier 1 is inserted into the read out device 133. FIG. 10 shows only part of the circuit which is continued and the other punching magnets 83 are connected with other "head" decoding devices and text line decoding devices in the same manner as illustrated in FIG. 10. The following, not illustrated punching magnet 83 is controlled by the second and by the sixteenth area 3 of the "head" line, with the tenth area 3 of the first text line, and with the fourth position of the variable information.

Figure 11:
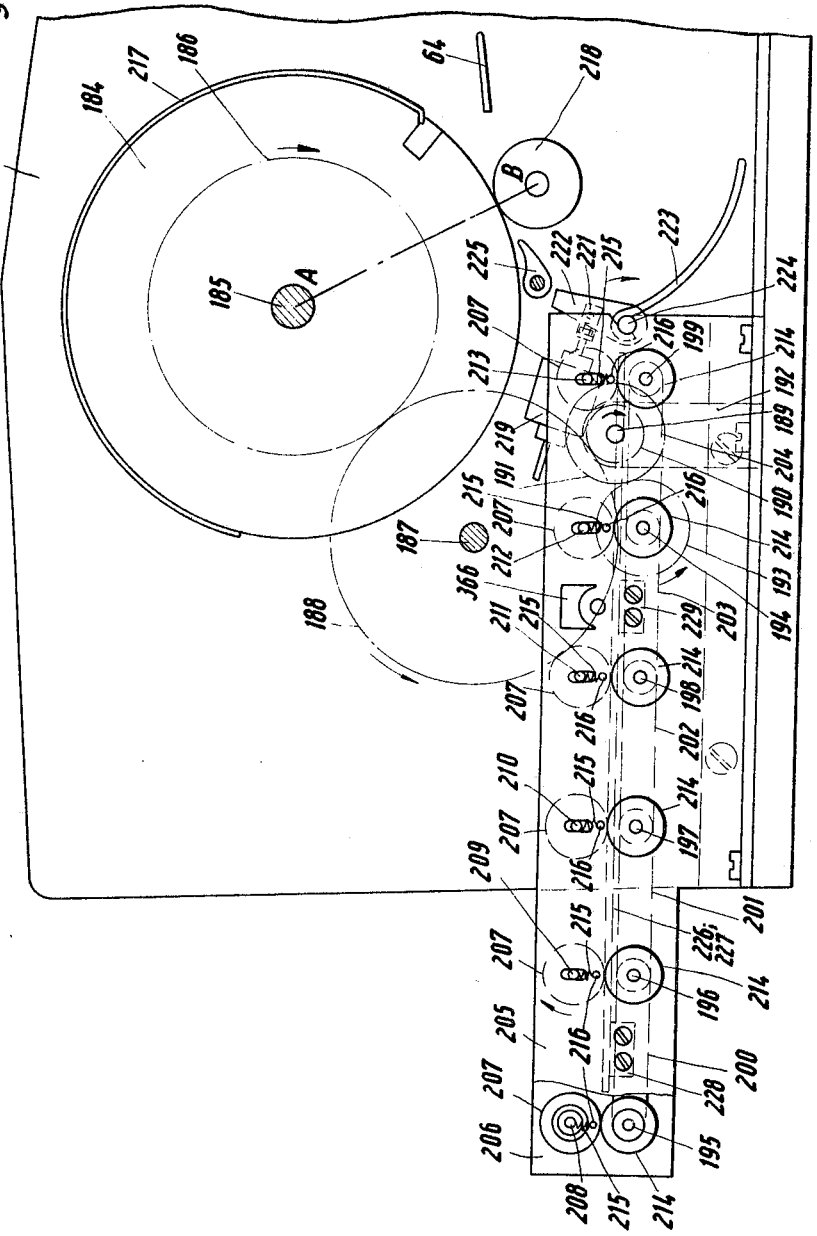
FIG. 11 is a fragmentary schematic side view, partially in section, illustrating transporting means controlled by the printing machine for transporting imprinted cards to the front of the machine, or to the rear of the machine toward the card storage means.
Figure 12:
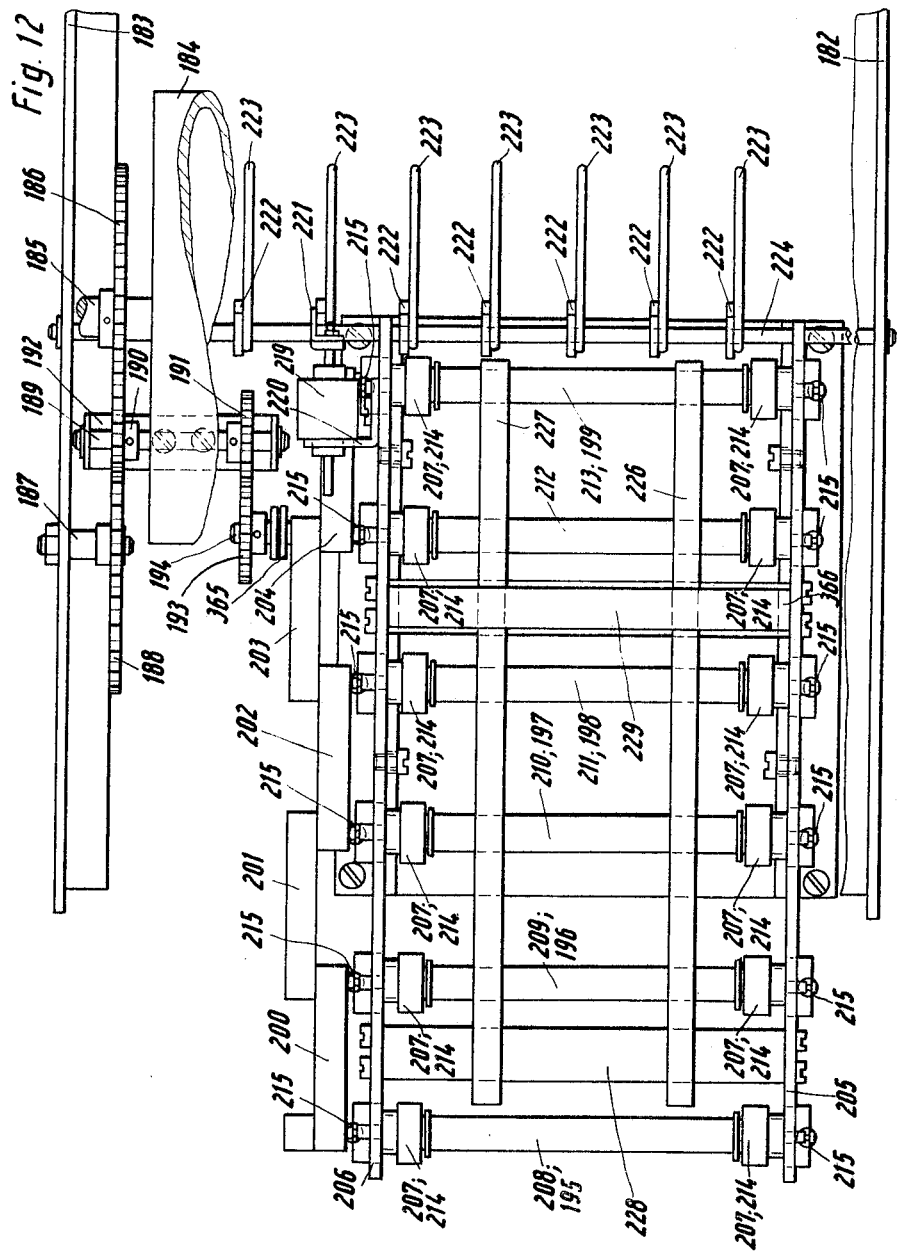
FIG. 12 is a fragmentary schematic plan view of the apparatus of FIG. 11.
Figure 14:
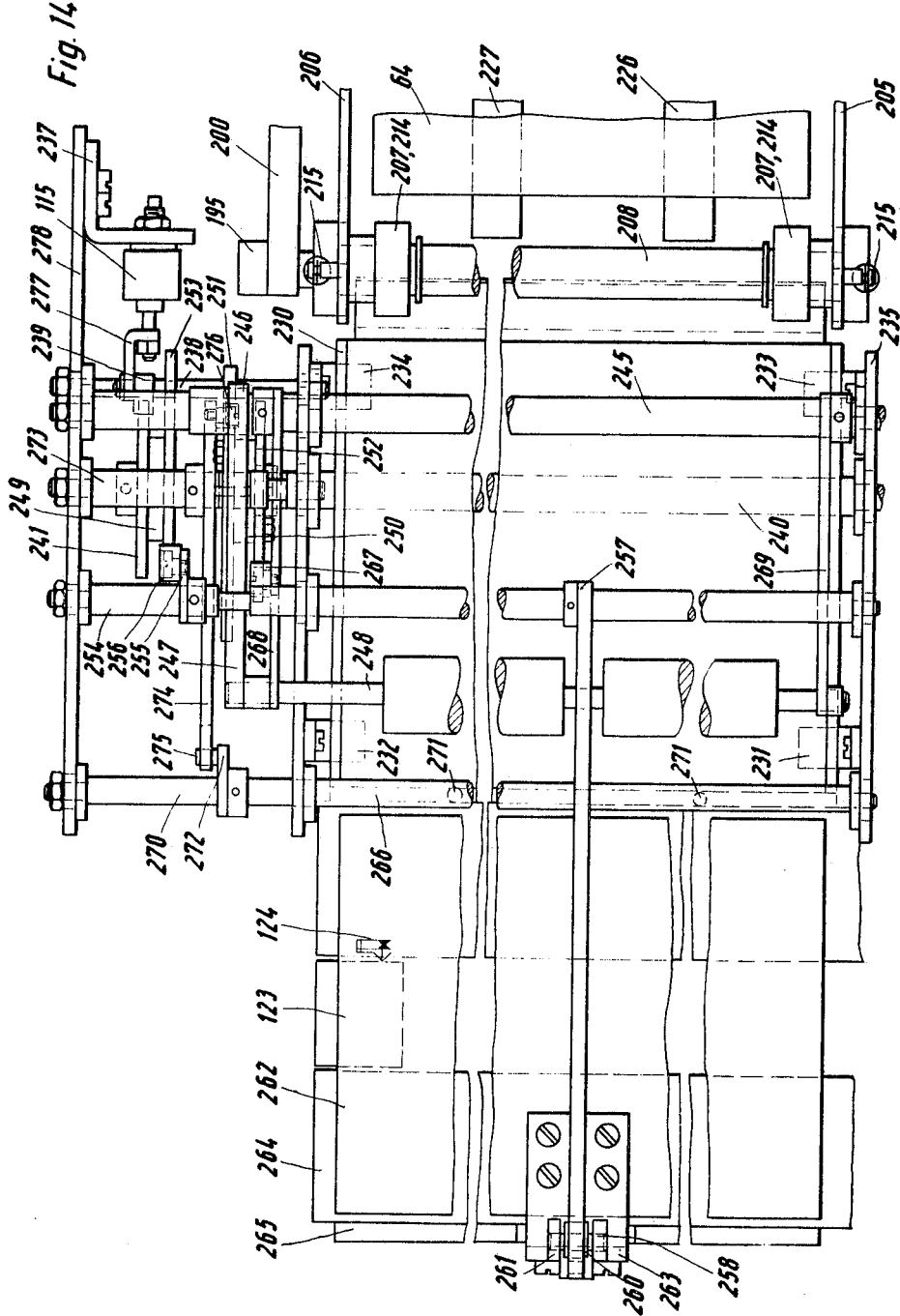
FIG. 14 is a fragmentary schematic plan view of the device of FIG. 13.

FIGS. 11 and 12 illustrate the transporting device by which the punch cards 64 are supplied to the control means shown in FIGS. 13 and 14. A duplicating or printing cylinder 184 is driven in the direction of the arrow. The shaft of printing roller 184 carries a gear 185 which drives over an intermediate gear mounted on a journal 187, the pair of gears 190 and 191 which are secured to shaft 189 which is mounted in a bearing means 192. Gear 191 drives through a gear 193 the shaft 194 which drives over belts 200, 201, 202, 203, 204, shafts 195 to 199 so that all shafts, which are mounted in lateral walls 205 and 206, rotate in synchronism. The rollers 214, which may have rubber covers, are fixed on shafts 194 to 199 and drive the associated rollers 207 in the direction of the arrow. Rollers 207, which may also have tubular rubber covers, are rotatably mounted on shafts 208 to 213 which are mounted in elongated slots of lateral walls 205 and 206 for vertical movement, and which are biased by springs 215 by means of spring pins 216 secured to lateral walls 205 and 206 to hold rollers 207 in contact with rollers 214.

Punch card 64 is supplied along a table, not shown, to the printing line formed by printing roller 184 and printing form 217 with counterpressure roller 218, the printing line being located in a plane A–B passing through the axes of printing roller 184 and counterpressure roller 218. Punch card 64 is imprinted by the printing form 217 when passing through the printing line. If the printed punch card 64 is to be transported to the forward part of the printing or duplicating machine, switch means, not illustrated, energize an electromagnet 119 which is secured to a bracket 220, while the electromagnet coupling 365 is de-energized so that the card transporting device remains in a position of rest. The energized electromagnet 219 attracts its armature and displaces through link 221 the control lever 222 and the guide wires 223, which are fixedly secured to shaft 224 so that the guide wires 223 assume the position shown in FIG. 11.

After a stripper 225 has separated punch card 64 from the printing form 217, the punch card 64 is guided along the control lever 222 and the guide wires 223 to a receptacle, not shown, located in the front of the printing machine.

If the punch card 64 is to be supplied to transporting rollers 207 and 214, control levers 222 turn with the turnably mounted shaft 224 upon de-energization of electromagnet 219 so far in the direction of the arrow that the next following imprinted punch card 64 is guided by the other side of control lever 222 into the region of the transporting rollers 207 and 214 which further transport the punch card.

In order to assure a reliable transport, punch cards 64 are guided on slide rails 226 and 227 which are fixedly connected with transverse members 228 and 229 secured to the lateral walls 205 and 206. In a modified arrangement, a dryer 366, for example, a radiator radiating infrared light, is arranged between the duplicating machine and the punching device for drying the freshly imprinted punch card 64, which is slightly moist, before the same is punched.

FIGS. 13 and 14 illustrate card storage means which include card storage device 105, card holding means 105a, and the control means by which the imprinted punch cards 64 are properly directed to the punching station. Transporting rollers 207 and 214, described with reference to FIGS. 11 and 12, transport punch card 64 along the guide rails 226 and 227 to the receptacle 230 which is secured to side walls 235 and 236 by brackets 231, 232, 233, 234. When switch 107 is closed by a transported punch card 64, electromagnet 115 which is mounted in a bearing means 237, is energized and tilts a pawl 239 which cooperates with a stop wheel 241 which is secured to a cam shaft 240 driven by belt 243 from a drive shaft 242. A belt 244 passes over a pulley on shaft 240 and another pulley 246 which is rotatable on shaft 245 so that the driven pulley 246 drives through a belt 247 the transporting rollers 248 in the direction of the arrow E.

After pawl 239 has been tilted, shaft 240 is driven in the direction of the arrow F so that hub flanges 249 and 250, which are secured to shaft 240, turn in the direction F together with cams 251, 252 which are secured to hub flange 250, and with cam 253 and stop wheel 241, secured to hub flange 249. A follower lever 255 mounted on shaft 254 has a follower roller 256 cooperating with cam 253 and moves during rotation in the direction of the arrow F from the lowest portion of cam 253 to the highest portion of the same so that due to the thus caused turning movement of shaft 254, lever 257, which is also mounted on shaft 254, is angularly displaced in the direction of the arrow G. Lever 257 has an elongated slot 259 for guiding a slide member 260 which is turnably mounted on a pin 258 which is connected with the part 261 of the holding means 262 which is located above a card transporting table 264 for holding down the cards. Holder 262 is guided by a guide member 263 in a guide portion of card transporting table 264, and is moved upward by operation of lever 257. Holder part 261 and guide member 263 are secured by screws to holding means 262 so that the same can be exactly adjusted in relation to the transporting surface of table 264. Holder 262 is raised to such a height above the table that punch card 64 can drop under the same onto the surface of table 264 which is bounded by fixed walls 265 and 266.

Before roller 267 or lever 268, which is mounted on shaft 245, engages the lowest portion of cam 252, punch card 64 has arrived in receptacle 230. Lever 268, lever 269, which is also mounted on shaft 245, and transporting roller 246 which turnably mounted between the levers 268 and 269, perform a pivotal movement in the direction of the arrow K until transporting roller 248 abuts a punch card 64, or several punch cards 64. Transporting roller 248, driven by belt 247, transports the punch cards 64 from receptacle 230 to card transporting table 264.

At this time, stop pins 271 are moved out of the region of the transported punch card 64 due to a turning movement of shaft 270 on which stop pins 271 are mounted. The turning of shaft 270 is effected by a lever 272 secured to shaft 270, and by lever 274 which is mounted on shaft 273, levers 272 and 274 being connected by a pin 275 projecting into an elongated slot.

Roller 276 of lever 274 runs onto the lug of cam 251 and displaces lever 274 in the direction of arrow H so that the lever 272 turns shaft 270.

When punch card 64 has moved beyond switch 107, the same opens and electromagnet 115 is de-energized and shaft 240 is stopped by pawl 239 and stop wheel 241 after one revolution.

An imprinted card 64 is transported toward the card storage means shown in FIG. 13 and first closes sensing switch 106 which has the function to prevent actuation of control electromagnet 115 by a preceding card which is in such a position that it closes switch 107. Otherwise, a card 64 may close switch 107 so that under certain conditions, electromagnet 115 is energized so that the card drops into a receptacle 230 and is immediately transported by transfer roller 248, designated 117 in FIG. 2, while an immediately following card could fall into receptacle 230 and jam by the closing stop pins 271.

If two cards 64 are on the way from the printing machine to the receptacle 230 of the storage device 105, and switches 106 and 107 are closed, electromagnet 115 is deenergized, as is apparent from FIG. 3. When switch 106 is open, and switch 107 is closed by a card 64, electromagnet 115 is only energized if switch 122 is open, and switches 124 and 164 are closed. That means that all cards on the card table 264 of the card holding means 105a must be first punched by the recording magnets 83. Only when the last card on table 264 under the holder 262 has left the holding means 105a and is on the way to the recording device, and when card knife 123 has returned to its initial position closing switch 124, and furthermore when switch 164 is closed in the recording device, the next following cards 64 operating switch 107 effect energization of control electromagnet 115, and transfer of a card from receptacle 230 by transfer roller 248 to the holding means 262, 264 whose holder 262 is raised by simultaneous operation of lever 257.

Switch 164, see FIGS. 2 and 3, is opened by a card transported by card knife 123 to transporting means 119, until the card has left the region of table 264. In the meantime, switch 124 is closed by card knife 123 returning to its initial position.

It may be noted that the first imprinted card closes switch 107 and energizes electromagnet 115, since no card has yet arrived at the card table 264 so that switch 122 is open. Switches 124 and 164 are closed at this moment. Since the printing machine 100, 106 prints cards 64 faster than they can be punched in the punching device, the card storage means 105 store the cards. The first transporting means 103 transports the cards 64 to the storage device 105, and when no card is sensed by switch 122 in the holding means 105a, the card transfer means 248 in FIG. 13, and 117 in FIG. 2, transfer the card from storage device 105 into holding means 105a whose holder 262 is raised at this moment, while the stop 271 is open to permit transfer of a card.

Transfer roller 248, card knife 123, and conveyor 119 may be considered second transporting means for transporting cards delivered by the first transporting means 103 to the storage means so that the cards are supplied to the recording device. As explained above, sensing means including switches 107 and 122 permit operation of control electromagnets 115 and 125 only when the recording means and correlated holding means, are ready to receive the card. All shafts shown in FIGS. 13 and 14 are mounted in lateral walls 235, 236, and 271, and 236 and 278, respectively, for turning movement.

FIGS. 15 and 16 illustrate a card transporting device by which the punched cards 64 are transported to the receptacle 99 in FIG. 2. The punched card is transported over transporting table 280 to a transporting wheel 282 which is fixed to a shaft 281 driven from the motor of the punching device. Shafts 285, 286, 287 are mounted in lateral walls 283 and 284 and turnably supported rollers 288 cooperating with transporting wheel 282 to transport the punch card 64 into a slot formed between two guide plates 289 and 290.

When punch card 64 passes over a switch actuator plate 292, lever 293 and switch actuator plate 292, which are both fixedly connected with a shaft 294 turnably mounted in side walls 283 and 284, pivot against the action of a spring 295 in the direction L, so that switch 142 opens. The curved guide plate 297 which is fixed to shaft 296, guides the punch card during movement along the transporting wheel 282 to successive transporting rollers 288.

Shafts 299 and 300 are mounted in a lateral wall 298 which may be part of the casing of the duplicating machine, and respectively carry drive rollers 301, 302 and drive rollers 303, 304 and worm gear 305. A motor 307 is mounted on a bracket 306 on lateral wall 298, and has a shaft 308 carrying the worm spindle 309 by which a worm gear 305 and a shaft 299 carrying the same are rotated in the direction of the arrow M.

Drive rollers 303 and drive belt 310 drive a drive roller 301 on shaft 300 also in the direction of the arrow M. By the drive roller 204, which is secured to shaft 299, drive belt 311, which is tensioned by rollers 312 to 319, and through the roller 302 secured to shaft 300, drive belt 320, which is tensioned by rollers 321, 312, 313, 314, 316, 317, 319, 322, 323, 324, and also by roller 304, so that the same moves in the direction of the arrow N.

When punch card 64 passes through guide slot 291, switch 325 is closed so that electromagnet 326, which is secured to a bracket 327, is energized. When roller 328 is now moved by electromagnet 326 and link 329 in the direction of the drive belt 320, the punch card 64 arrives in a position in which it is pressed by roller 328 against the drive belt 320 which serves as a conveyor belt. The rotating belts 311 and 320 transport punch card 64, which is clamped on one side between belts 311 and 320, to the receptacle 279 and deposited in the same.

Punch card 64 moves beyond switch 325 so that the same opens as soon as the punch card is gripped by the belts 311 and 320 and transported.

It will be understood that each of the elements described above, or two or more together, may also find a useful application in other types of punching and recording apparatus differing from the types described above.

While the invention has been illustrated and described as embodied in an apparatus by which cards are imprinted at a first speed, and then punched at a second speed, and in which an imprinted card is temporarily stored before transported to the punching device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapted it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be protected by Letters Patent is set forth in the appended claims.

I claim:

1. Card printing and recording apparatus comprising, in combination, a printing machine for imprinting cards with legible information; a recording device for recording information on said cards; first and second means for actuating said printing machine and said recording device to perform on said cards printing and recording operations, respectively, independently of each other, said printing machine printing in the same time more cards than can be recorded on by said recording device; card storage means for temporarily storing imprinted cards; first transporting means for transporting imprinted cards from said printing machine to said card storage means; second transporting means for transporting imprinted cards out of said card storage means and to said recording device; sensing means for sensing cards in said first transporting means and in said recording device; and control means controlled by said sensing means and operatively connected with said second transporting means for starting the same only when said sensing means senses a card in said first transporting means and no card in said recording device whereby cards imprinted at a high speed are stored in said storage means until said recording device which operates at a lower speed is ready for a recording operation on an imprinted card.

2. Apparatus as claimed in claim 1, wherein said storage means include releasable stop means for stopping imprinted cards; and wherein said control means are connected with said stop means for releasing the same under the control of said sensing means before starting said second transporting means.

3. Apparatus as claimed in claim 2, wherein said control means include cam means, and cam follower means connected with said stop means for operating the same; and comprising drive means and a one revolution clutch connecting said drive means with said cam means.

4. Apparatus as claimed in claim 3, said recording device holding means movable between a holding position resting on a card, and a raised position; and wherein said cam follower means is operatively connected with said holding means for raising the same from said card before releasing said stop means so that a card is placed under said holding means.

5. Apparatus as claimed in claim 4, wherein said drive means includes an electromagnet for starting the operation of said one revolution clutch, and wherein said sensing means includes a switch for energizing said electromagnet.

6. Apparatus as claimed in claim 5, wherein said cam means and cam follower means operate in a predetermined sequence so that first said holding means is raised and said stop means is released whereupon said second transporting means are started.

7. Apparatus as claimed in claim 6, wherein said second transporting means include transporting roller means movable between an inoperative position and an operative position for transporting cards in said storage means; and wherein said cam follower means move said transporting roller means into engagement with a card for transporting the same.

8. Apparatus as claimed in claim 1 comprising guide means having a first position for guiding cards from said printing machine to said first transporting means, and a second position for guiding cards from said printing machine to the front of the same; and operator controlled means for moving said guide means between said first and second positions whereby only selected cards are transported by said first and second transporting means to said recording device.

9. Apparatus as claimed in claim 8, wherein said first transporting means include electromagnetic coupling means driven from said printing machine; and comprising means controlled by said guide means to disengage said coupling means when said guide means is in said second position so that said first transporting means stop when a card is delivered to the front of said printing machine and not to said first transporting means.

10. Card printing and recording apparatus comprising, in combination, a printing machine for imprinting cards with legible information; a recording device for recording said information on said cards; first and second means for actuating said printing machine and said recording device to perform on said cards printing and recording operations, respectively, independently of each other, said printing machine printing in the same time more cards than can be recorded on by said recording device; card storage means for temporarily storing imprinted cards comprising stop means for stopping and releasing cards; first transporting means for transporting imprinted cards from said printing machine to said card storage means; second transporting means for transporting stored imprinted cards out of said storage means and to said recording device independently of said first transporting means and being controlled by said recording device in synchronism with the recording operations; control means controlled by said recording device including cam means, and cam follower means connected with said stop means for operating the same; drive means connected with said cam means for operating the same and including a one revolution clutch; an electromagnet for starting operation of said one revolution clutch; and a switch for energizing said electromagnet operated by the last card in said recording device.

11. Apparatus as claimed in claim 10, wherein said second transporting means include transporting roller means which can be raised to an inoperative position and lowered to an operative position; and wherein said cam follower means lowers said transporting roller means into engagement with said cards to transport the same.

12. Card printing and recording apparatus comprising, in combination, a printing machine for imprinting cards with legible information; a recording device for recording said information on said cards; first and second means for actuating said printing machine and said recording device to perform on said cards printing and recording operations, respectively, independently of each other, said printing machine printing in the same time more cards than can be recorded on by said recording device; card storage means for temporarily storing imprinting cards; first transporting means for transporting imprinted cards from said printing machine to said card storage means; second transporting means for transporting stored imprinted cards independently of said first transporting means out of said card storage means and to said recording device and being controlled by the same in synchronism with the recording operations; readout means for sensing a record carrier and connected with said recording device for controlling the same so that information represented by said record carrier is recorded on said cards; stepwise movable transporting means for transporting said record carrier to said read-out means so that the same read out successive lines of said record carrier while the same is at a standstill; and switch means in the path of cards transported by said second transporting means connected with said stepwise movable transporting means and actuated by said cards to cause a step of said stepwise movable transporting means and of said record carrier when recording of information contained in a line of said record carrier on a card is completed.

13. Apparatus for continuously printing and recording on cards, comprising, in combintion, a printing machine for imprinting cards with legible information; a recording device for recording information on said cards; first and second means for actuating said printing machine and said recording device to perform on said cards printing and recording operations, respectively, said printing machine printing in the same time more cards than can be recorded on by said recording device; a card storage device for temporarily storing imprinted cards; first transporting means for transporting imprinted cards from said printing machine to said card storage device; card holding means correlated with said recording device and having a normal holding position for holding at least one card, and an open position; second transporting means for transporting cards from said holding means only in said holding position to said recording device; card transferring means for transferring cards from said card storage device to said card holding means; sensing means for sensing cards in said card holding means; and control means connected with said card holding means and with said card transferring means, and being controlled by said sensing means when the same sense a card in said holding mean to maintain said holding means in said normal holding position and to stop said transferring means whereby movement of said holding means to said open position and transfer of cards are prevented while said second transporting means transport cards from said holding means to said recording device so that imprinted cards accumulate in said card storage device, and being controlled by said sensing means when the same sense no card in said card holding means to first move said holding means to said open position and to then actuate said card transferring means to transfer all cards accumulated in said card storage device to said card holding means so that cards are transferred to said card holding means only when no cards are transported by said second transporting means out of said holding means.

14. Apparatus as claimed in claim 13 wherein said card storage device includes a receptacle for cards; wherein said card transferring means includes a transfer roller; wherein said holding means includes a card table and a movable card holder having said open position, and said normal holding position resting on said card table for holding cards thereon; wherein said sensing means include switch means; and wherein said control means raises said card holder to said open position before operating said transporting roller to transfer cards accumulated in said card storage device to said card table.

15. Apparatus as claimed in claim 13 comprising second sensing means for sensing a card in said recording device; and second control means controlled by said second sensing means and connected with said second transporting means for starting the same only when said second sensing means senses no card in said recording device.

References Cited

UNITED STATES PATENTS

| | | | |
|---|---|---|---|
| 1,608,837 | 11/1926 | Bryce | 101—93 |
| 1,909,548 | 5/1933 | Pierce | 101—19 |
| 2,168,763 | 8/1939 | Daly et al. | 101—19 |
| 2,335,949 | 12/1943 | Lewis et al. | 101—19 |
| 2,676,416 | 4/1954 | Calosi et al. | 101—416.1 X |
| 3,085,143 | 4/1963 | Antoncich | 101—416.1 X |

WILLIAM B. PENN, Primary Examiner

U.S. Cl. X.R.

101—91